United States Patent
Hursey et al.

(10) Patent No.: US 11,711,425 B1
(45) Date of Patent: Jul. 25, 2023

(54) BROADCAST AND SCATTER COMMUNICATION OPERATIONS

(71) Applicant: International Business Machines Corporation, Armonk, NY (US)

(72) Inventors: Joshua J. Hursey, La Crosse, WI (US); Austen William Lauria, Fishkill, NY (US); William P. LePera, Wappingers Falls, NY (US); Scott Miller, Meadville, PA (US); Robert Perricone, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/046,962

(22) Filed: Oct. 17, 2022

(51) Int. Cl.
*H04L 67/1095* (2022.01)
*H04L 45/74* (2022.01)

(52) U.S. Cl.
CPC .......... *H04L 67/1095* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 10,630,410 B2 | 4/2020 | Parkvall et al. | |
| 10,938,497 B2 | 3/2021 | Parkvall et al. | |
| 10,985,808 B2 | 4/2021 | Park et al. | |
| 2019/0334644 A1* | 10/2019 | Thubert | H04J 3/245 |
| 2020/0052997 A1* | 2/2020 | Ramanathan | H04L 69/22 |
| 2021/0336883 A1* | 10/2021 | Pudiyapura | H04L 47/2441 |

OTHER PUBLICATIONS

Barbette et al., "Combined Stateful Classification and Session Splicing for High-Speed NFV Service Chaining", Jul. 30, 2021, IEEE, IEEE/ACM Transactions on Networking (vol. 29, Issue: 6, pp. 2560-2573) (Year: 2021).*
Zhou et al., "A Bandwidth-Saving Optimization for MPI Broadcast Collective Operation," 2015 44th International Conference on Parallel Processing Workshops, (2015): 8 pages.
Hoefler et al., "A practically constant-time MPI Broadcast Algorithm for large-scale InfiniBand Clusters with Multicast," 2007 IEEE International Parallel and Distributed Processing Symposium, (2007): pp. 1-8.

(Continued)

*Primary Examiner* — Davoud A Zand
(74) *Attorney, Agent, or Firm* — Cantor Colburn LLP; Tihon Poltavets

(57) ABSTRACT

According to an aspect, a computer-implemented method for performing distributed communication operations includes receiving a request, by a first computing system, to perform a distributed communication operation and obtaining, by the first computing system, a tree structure for performing the distributed communication operation, wherein the first computing system is a root node of the tree structure. The method also includes creating, by the first computing system, a message having header information and a payload for the distributed communication operation and transmitting, by the first computing system, a portion of the message to each child node of the first computing system, wherein the portion transmitted to each child node is unique.

20 Claims, 7 Drawing Sheets

(56) References Cited

OTHER PUBLICATIONS

Calmex Insight and Innovation, "Synchronizing Professional Broadcast Networks" calnexsol.com (2021): 4 pages.
Dunna et al. "{SyncScatter}: Enabling {WiFi} like synchronization and range for {WiFi} backscatter Communication." 18th USENIX Symposium on Networked Systems Design and Implementation (NSDI), (2021): pp. 923-937.
Chu et al., "Exploiting Hardware Multicast and GPUDirect RDMA for Efficient Broadcast," in IEEE Transactions on Parallel and Distributed Systems, vol. 30, No. 3, pp. (2019): 575-588.
Hasanov et al., "High-Level Topology-Oblivious Optimization of MPI Broadcast Algorithms on Extreme-Scale Platforms" In: L. Lopes et al. Euro-Par 2014: Parallel Processing Workshops. Euro-Par 2014. Lecture Notes in Computer Science, vol. 8806. Springer, Cham. (2014): pp. 412-424.
Thakur et al., "Improving the Performance of Collective Operations in MPICH," J. Dongarra, D. Laforenza, S. Orlando (Eds.): Part of the Lecture Notes in Computer Science book series, Euro PVM/MPI 2003, LNCS 2840, (2003): pp. 257-267.
Disclosed Anonymously, "Switch Broadcast/Multicast Hitch Hiker Grants" Apr. 1, 2013, An IP.com Prior Art Database Technical Disclosure, IP.com No. IPCOM000226378D, 4 pages.
Soares et al., "Method and System for Providing Media Stream Comparison for Affiliate Broadcast Monitoring" Nov. 4, 2020, An IP.com Prior Art Database Technical Disclosure, IP.com No. IPCOM000264052D, 9 pages.
Tokopedia et al., "Distributed Consensus Model for Data Synchronization Between Applications," Nov. 18, 2021, An IP.com Prior Art Database Technical Disclosure, IP.com No. IPCOM000267739D, 7 pages.
Kowalski et al., "Dynamic multiple-message broadcast: bounding throughput in the affectance model." Proceedings of the 10th ACM international workshop on Foundations of mobile computing. (2014): 19 pages.
J. L. Träff, "On Optimal Trees for Irregular Gather and Scatter Collectives," in IEEE Transactions on Parallel and Distributed Systems, vol. 30, No. 9, (2019): 29 pages.
J. L. Träff et al., "Optimal broadcast for fully connected processor-node networks" J. Parallel Distrib. Comput. (2008): pp. 887-901.
Pjesivac-Grbovic et al., "Performance analysis of MPI collective operations," 19th IEEE International Parallel and Distributed Processing Symposium, (2005): 25 pages.
Wadsworth et al., "Performance of MPI broadcast algorithms," 2008 IEEE International Symposium on Parallel and Distributed Processing, (2008): 7 pages.
Hasanov et al., "Topology-oblivious optimization of MPI broadcast algorithms on extreme-scale platforms" Simul. Model. Pract. Theory (2015): pp. 30-39.

* cited by examiner

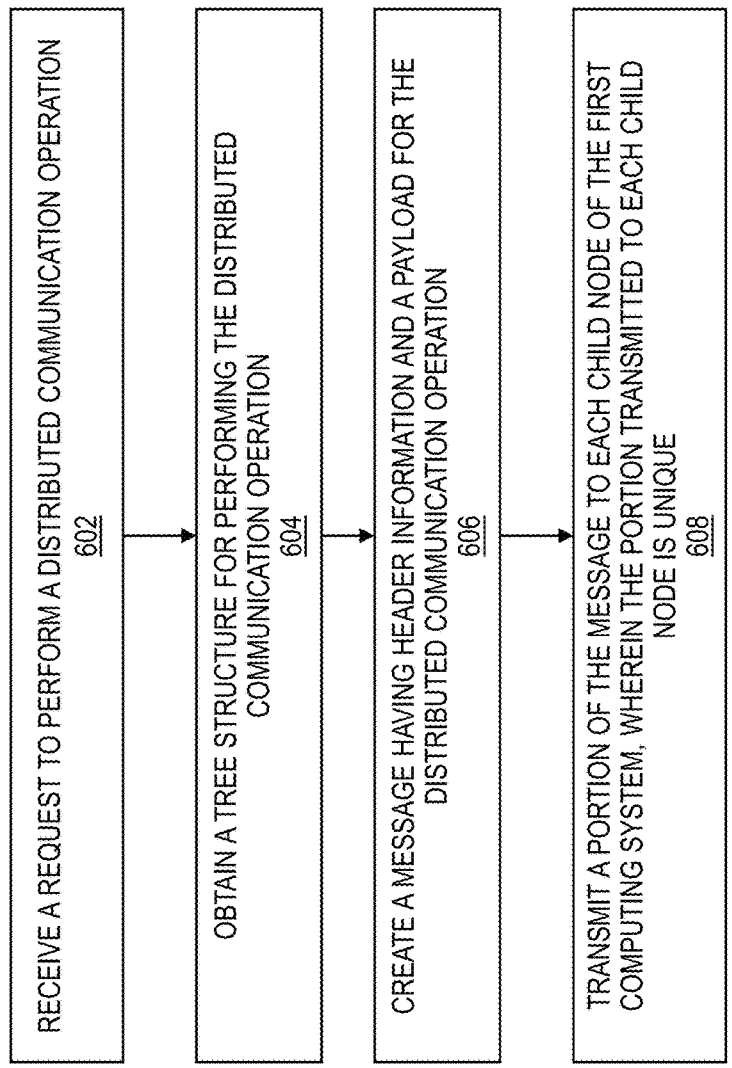

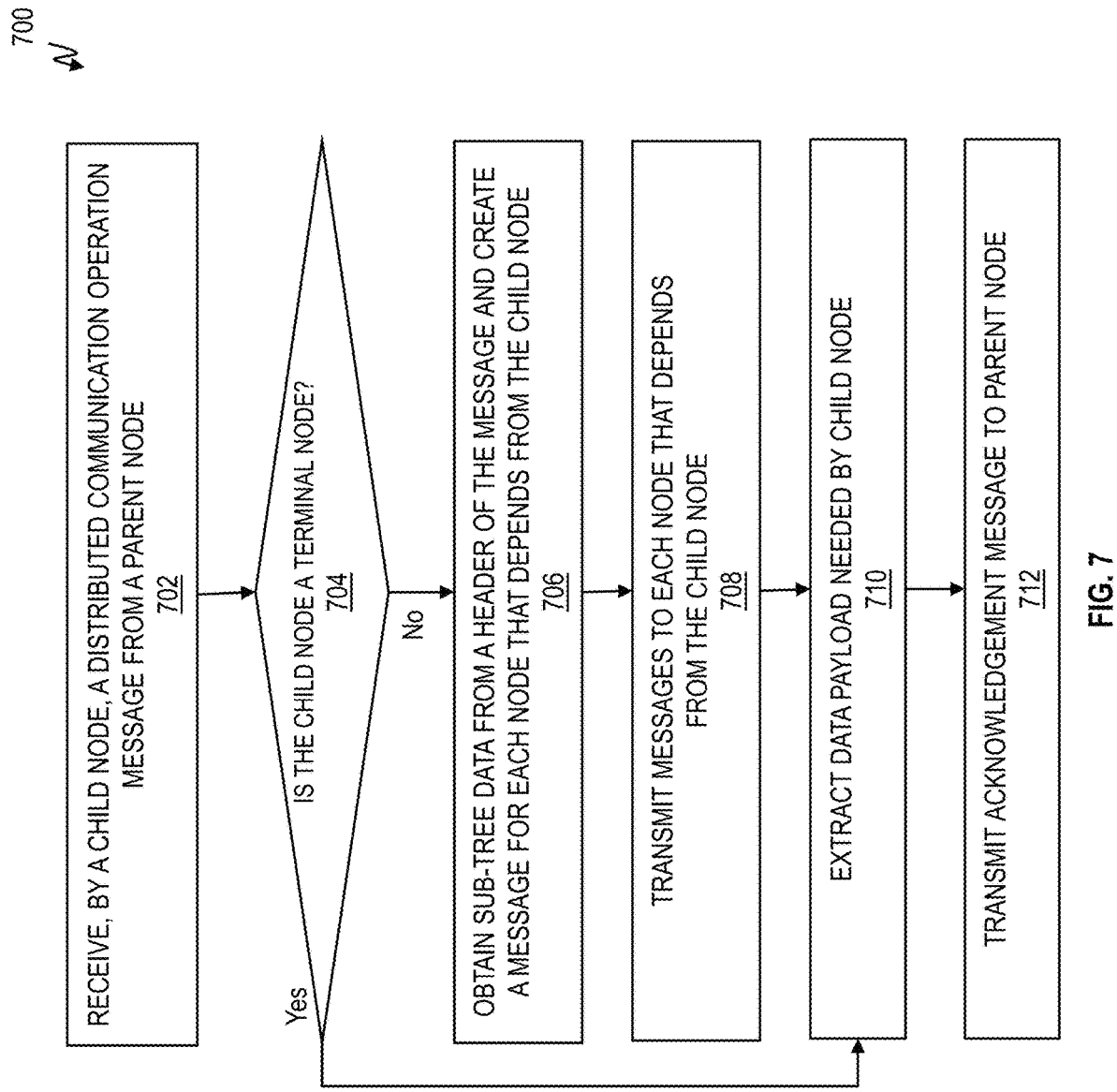

BROADCAST AND SCATTER COMMUNICATION OPERATIONS

BACKGROUND

The present invention generally relates to communications networks, and more specifically, to computer systems, computer-implemented methods, and computer program products for performing distributed operations, such as broadcast and scatter communication operations.

Broadcasting a message to a set of participants (e.g., processes, machines) across a network is a frequently used pattern in distributed systems. In this pattern, an origin participant (sometimes called the "root") sends the same message to a set of remote participants, often in a tree pattern. Scattering a message may be seen as a derivation of the broadcast operation. The origin participant ("root") sends a different message to each remote participant, often using a tree pattern to improve performance over a centralized point-to-point communication pattern.

Many High-Performance Computing (HPC) and Machine Learning (ML) applications rely on the Message Passing Interface (MPI) standard and similar libraries for point-to-point and collective communication between distributed operations. The MPI standard defines the MPI_Bcast and MPI_Scatter(v) operations for these two widely used collectives. Additionally, other collective algorithms, such as MPI_Allgather and MPI_Allreduce, often rely on broadcast and scatter operations to support the higher-level algorithm.

Broadcast and scatter collective algorithms are also beneficial to any distributed system of persistent daemons for the distribution of information. HPC schedulers and job launchers frequently use these patterns to update the distributed state and send "job launch" messages to all remote systems, which starts the application. Specifically, the latter example of job launch greatly benefits from efficient broadcast and scatter algorithms yielding faster launch times for user applications and increasing machine utilization. Generally, improvements to these two collective communication patterns, especially in dynamic networking environments such as the cloud, can yield significant performance benefits for client applications and data center middleware.

SUMMARY

Embodiments of the present invention are directed to a method for performing distributed communication operations. According to an aspect, a computer-implemented method includes receiving a request, by a first computing system, to perform a distributed communication operation and obtaining, by the first computing system, a tree structure for performing the distributed communication operation, wherein the first computing system is a root node of the tree structure. The method also includes creating, by the first computing system, a message having header information and a payload for the distributed communication operation and transmitting, by the first computing system, a portion of the message to each child node of the first computing system, wherein the portion transmitted to each child node is unique.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 is a flowchart of a method for initiating a distributed communication operation in accordance with one or more embodiments of the present invention; and FIG. 7 is a flowchart of a method for performing distributed communication operations in accordance with one or more embodiments of the present invention.

DETAILED DESCRIPTION

Figure 1:
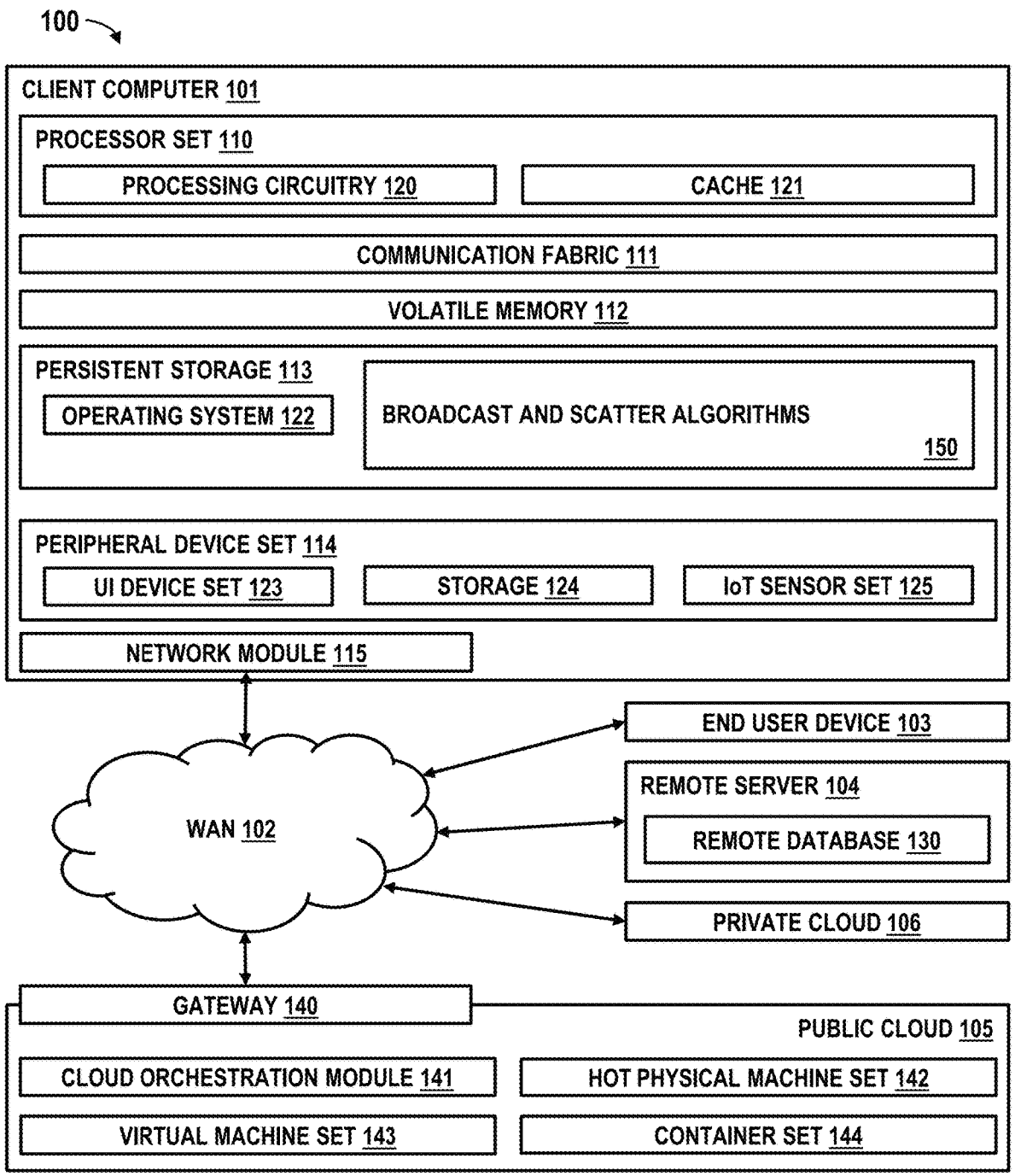
FIG. 1 depicts a block diagram of an example computer system for use in conjunction with one or more embodiments of the present invention.

As discussed above, the broadcast and scatter algorithms have become increasingly used by HPC and ML processes. Existing broadcast and scatter algorithms require that members know the tree structure before the operation begins to understand their role in the communication protocol. If the tree structure needs to adapt to membership, network conditions, and/or message size, then updates to the tree structure must be distributed before starting the collective operation. This often requires a hard synchronization when switching trees interrupting network traffic. For scatter communication patterns, the organization of the data in the buffer can impact the performance of the operation. For example, if each stage in the algorithm needs to calculate different memory offsets and access different regions of memory to compile a subset of the buffer for their subtree.

In exemplary embodiments, improved broadcast and scatter algorithms are provided which do not require that members, other than the root, have prior knowledge of the tree structure. The improved broadcast and scatter algorithms dynamically adapt to current network environments without synchronization. In addition, the improved broadcast and scatter algorithms are configured to manage the data to be transmitted during the broadcast and scatter algorithms to improve performance.

In exemplary embodiments, only the origin participant ("root") knows the tree structure when starting the broadcast and/or scatter operation. This allows the origin ("root") to dynamically adjust the tree structure per message without synchronizing with the other communication participants. The root encodes the tree structure for that communication operation in the header(s) of the message sent to their children. The non-origin participants, child nodes, receive a message from their parent in the tree containing instructions for the next hop in the tree relative to themselves. The message includes a header that describes the subtree structure at and below that point in the tree and instructions for pruning extraneous data for the next step in the communication operation. The non-origin participants need to only unpack their instructions for sending to their children, if any, in the tree without regard for the tree structure above them or below the children. Further, the data in each message is organized to optimize memory references in a scatter operation as it progresses down the tree. In an exemplary embodiment, the method can be used for broadcast operations, scatter operations with regularly sized and irregularly sized per participant messages, and a combination of the two in a combined operation.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the broadcast and scatter operations 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
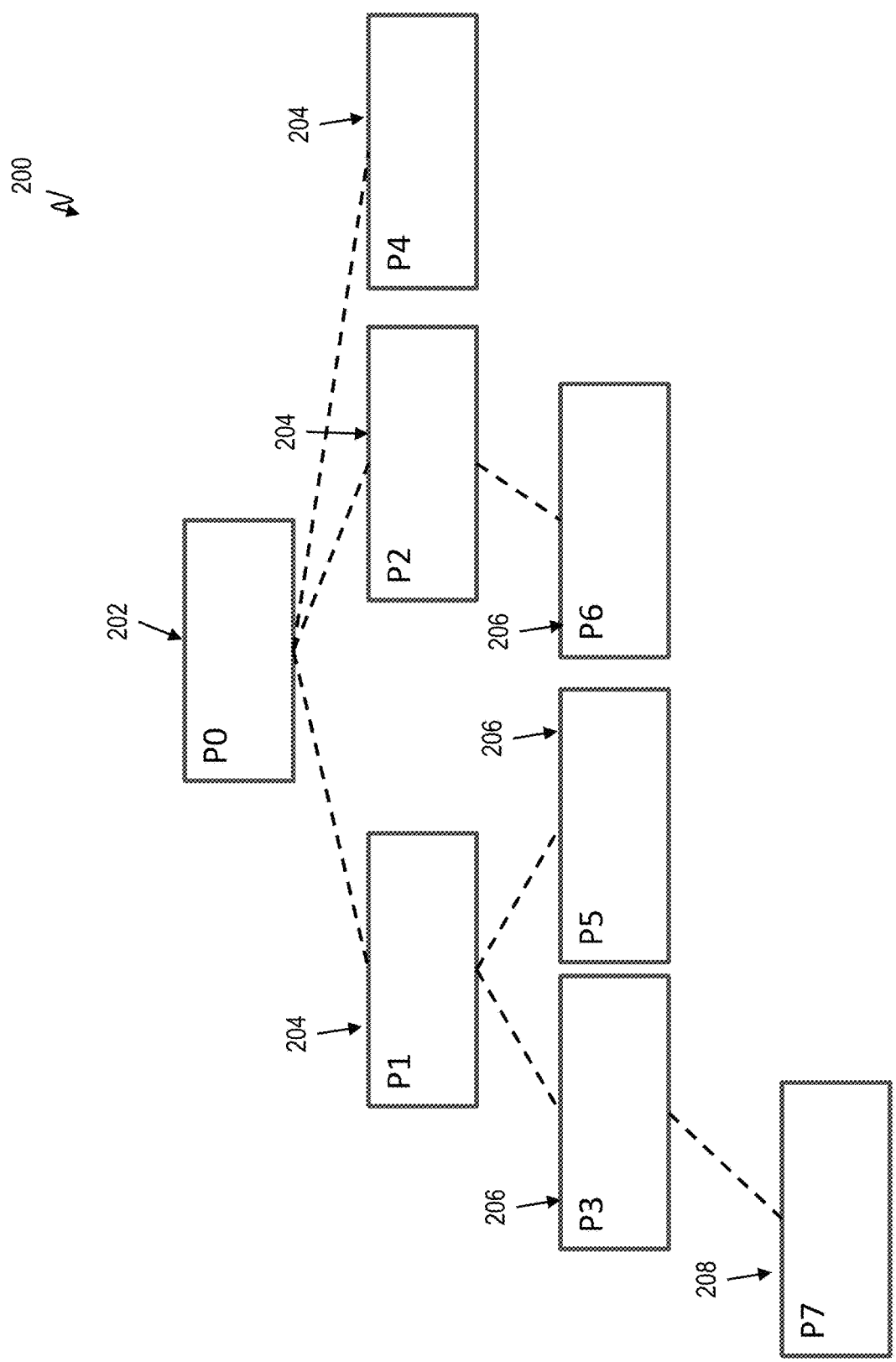
FIG. 2 is a block diagram of a tree structure for use in conjunction with one or more embodiments of the present invention.

Referring now to FIG. 2, a block diagram of a tree structure 200 for use in conjunction with one or more embodiments of the present invention is shown. In exemplary embodiments, the tree structure 200 includes a root node 202, also referred to as an origin node or origin participant, and a plurality of child nodes 204, also referred to as participant nodes. As shown, one or more of the plurality of child nodes 204 can have child nodes 206 that depend from child node 204, and child nodes 206 can have child nodes 208 that depend from child node 206. In exemplary embodiments, each of the nodes (root node 202 and child nodes 204, 206, and 208) may be embodied in a computer 101, as shown in FIG. 1.

In exemplary embodiments, prior to initiating a distributed communication operation, such as a broadcast or scatter operation, the origin participant 200 obtains a tree structure 200 that will be used for the distributed communication operation. In one embodiment, the tree structure 200 is only known by the origin participant 202 and not the other participant nodes. In exemplary embodiments, the tree structure 200 may differ per communication operation even to the same set of participants. The tree structure does not need to be in a regular pattern but can be irregular based on external input such as network conditions. The method for creating the tree structure 200 is outside of the scope of this invention and any of a variety of known techniques may be used to create the tree structure 200.

Figure 3:
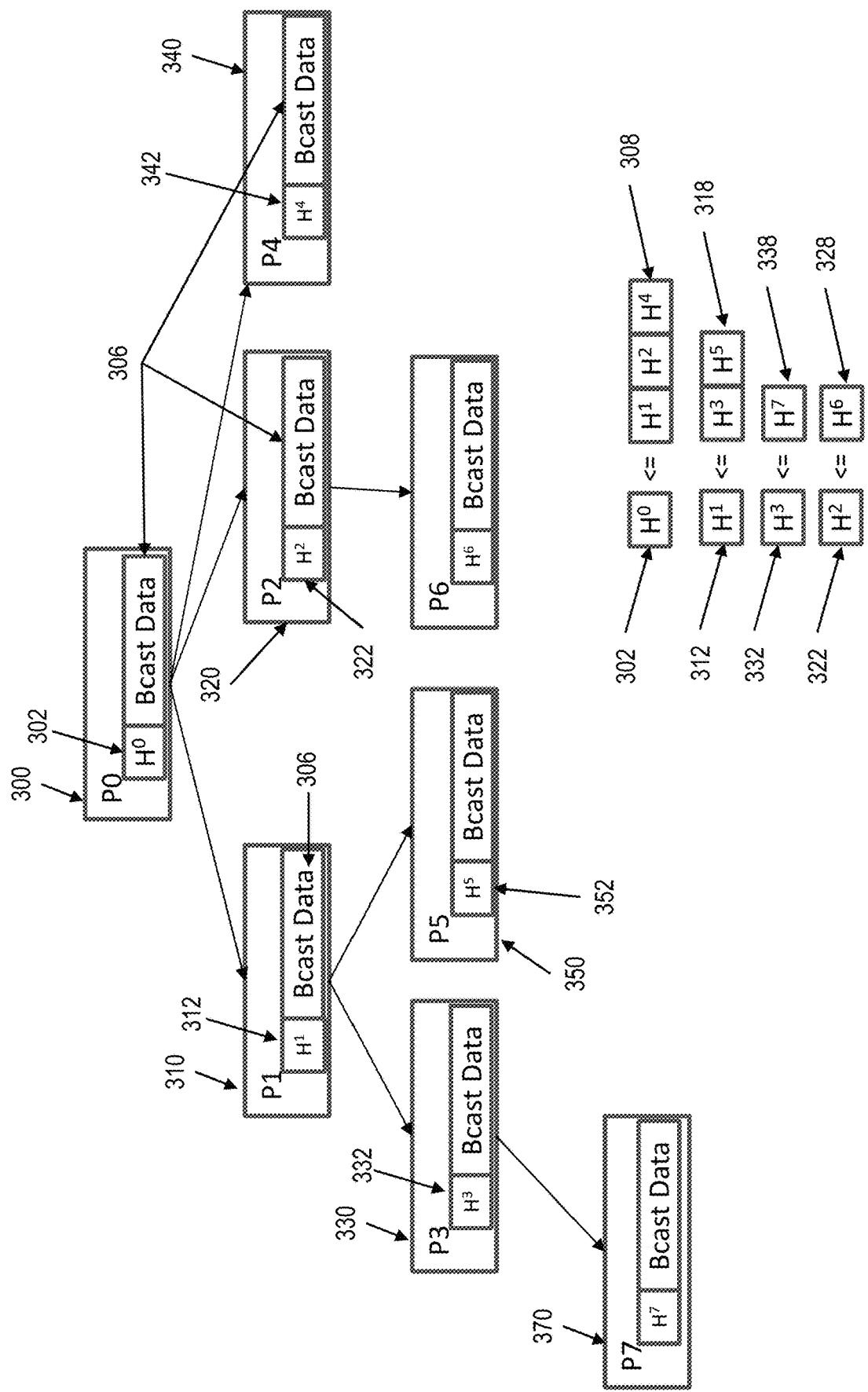
FIG. 3 is a block diagram illustrating a broadcast operation in accordance with one or more embodiments of the present invention.

Referring now to FIG. 3, a block diagram illustrating a broadcast operation in accordance with one or more embodiments of the present invention is shown. In a broadcast operation, the origin participant 300 adds a header 302 to the message payload in a well-known location either before or after the message payload 306. The header 302 describes the base address of the data payload 306, length of the data payload 306, and subtree structure 308 for the receiving participant ("child"). As illustrated, the headers 312, 322, 342 transmitted to child nodes 310, 320, 340, respectively, are different from one another as each includes a different subtree structure 308. In one embodiment, a cached subtree structure is used and a marker identifying that cached subtree is sent instead of the subtree structure for the receiving participant.

In exemplary embodiments, once the origin participant 300 has assembled the data payload 306 and headers, the origin participant 300 starts the broadcast operation. The origin participant 300 transmits header 312 and data payload 306 to child node 310, header 322 and data payload 306 to child node 320, and header 342 and data payload 306 to child node 340.

In exemplary embodiments, a child participant will receive the data payload from their parent, which is unknown to them before the start of the messaging protocol. The child participant will inspect the data payload to discover the structure of the data payload and the form of the subtree below them, if any. In exemplary embodiments, when a child participant receives the header and data payload 306, the child participant prunes the header of subtree information that does not pertain to the subtree to which they are sending and transmits a new header and data payload to its child nodes. For example, after node 310 receives header 312 and data payload 306, the node 310 will prune the header 312 to create header 332 and header 352, which are respectively transmitted to nodes 330 and 350, along with the data payload 306.

If the child is a terminal node, such as node 370, then the propagation of the payload data 306 terminates. If an acknowledgment is requested, then each node transmits an acknowledgment message to its immediate parent, (i.e., to whom it received the message). If the child is non-terminal and an acknowledgment is requested, then the node will wait until receiving acknowledgment messages from its subtree before forwarding that acknowledgment to its immediate parent for that message. In exemplary embodiments, the propagation pattern continues until all participants have received the data payload destined for them and sent any acknowledgment required.

Figure 4:
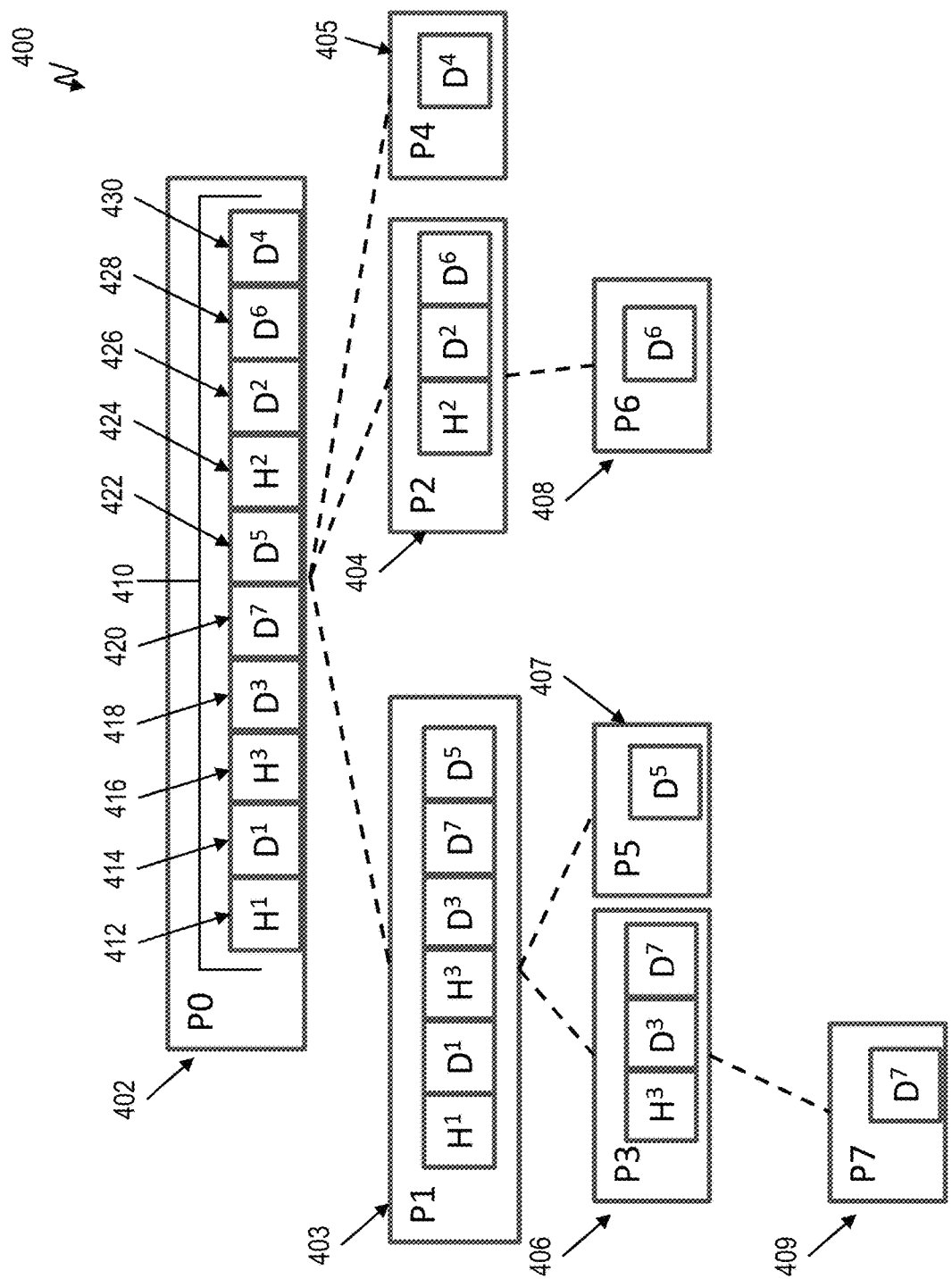
FIG. 4 is a block diagram illustrating a scatter operation in accordance with one or more embodiments of the present invention.

Referring now to FIG. 4, a block diagram illustrating a scatter operation 400 in accordance with one or more embodiments of the present invention is shown. In exemplary embodiments, when the origin participant 402 initiates a scatter operation 400, the origin participant 402 obtains a tree structure to be used for the scatter operation 400. The tree structure includes a plurality of nodes 403, 404, 405, 406, 407, 407, 408 and 409.

After the tree structure is obtained, the origin participant 402 creates a message 410 that includes multiple headers 412, 416, 424, and multiple data payloads 414, 418, 420, 422, 426, 428, 430. In exemplary embodiments, the origin participant 402 creates a data payload 414, 418, 420, 422, 426, 428, 430 for each node 403, 404, 405, 406, 407, 408 and 409 in the tree structure. Likewise, the origin participant 402 creates a header 412, 416, 424 for each node 403, 406, 404 of the tree structure that has at least one child node. In exemplary embodiments, the header 412, 416, 424 for each node 403, 406, 404 includes a description of the sub-tree of the tree structure that depends on the node 403, 406, 404. The header 412, 416, 424 may also describes the base address of the data payloads 414, 418, 420, 422, 426, 428, 430, length of the data payloads 414, 418, 420, 422, 426, 428, 430.

In exemplary embodiments, the message 410 is created by the origin participant 402 such that the portions of the message 410 that will be transmitted to each child node are contiguous. For example, as illustrated, the headers 412, 416 and data payloads 414, 418, 420, 422 that are transmitted to child node 403 are contiguous. Likewise, header 424 and data payloads 426, 428 that will be transmitted to child node 404 are contiguous. In one embodiment, a cached subtree structure is used and a marker identifying that cached subtree is sent instead of the subtree structure for the receiving participant.

Once a child node receives a portion of the message 410, the child node is configured to extract the data needed by the child node and split the remaining headers and data payloads using the information from the header for the child node. For example, once child node 403 receives the portion of the message from the origin participant 402, \ child node 403 extracts the data payload 414 needed by child node 403 and uses the information in header 412 to separate the remaining portion of the message 410 into separate parts. The child node then propagates a portion of the message, i.e., it only sends the subset of the headers and data payloads destined for a specific subtree to that subtree. For example, child node 403 transmits header 416 and data payloads 418, 420 to child node 406 and data payload 422 to child node 407.

Figure 5:
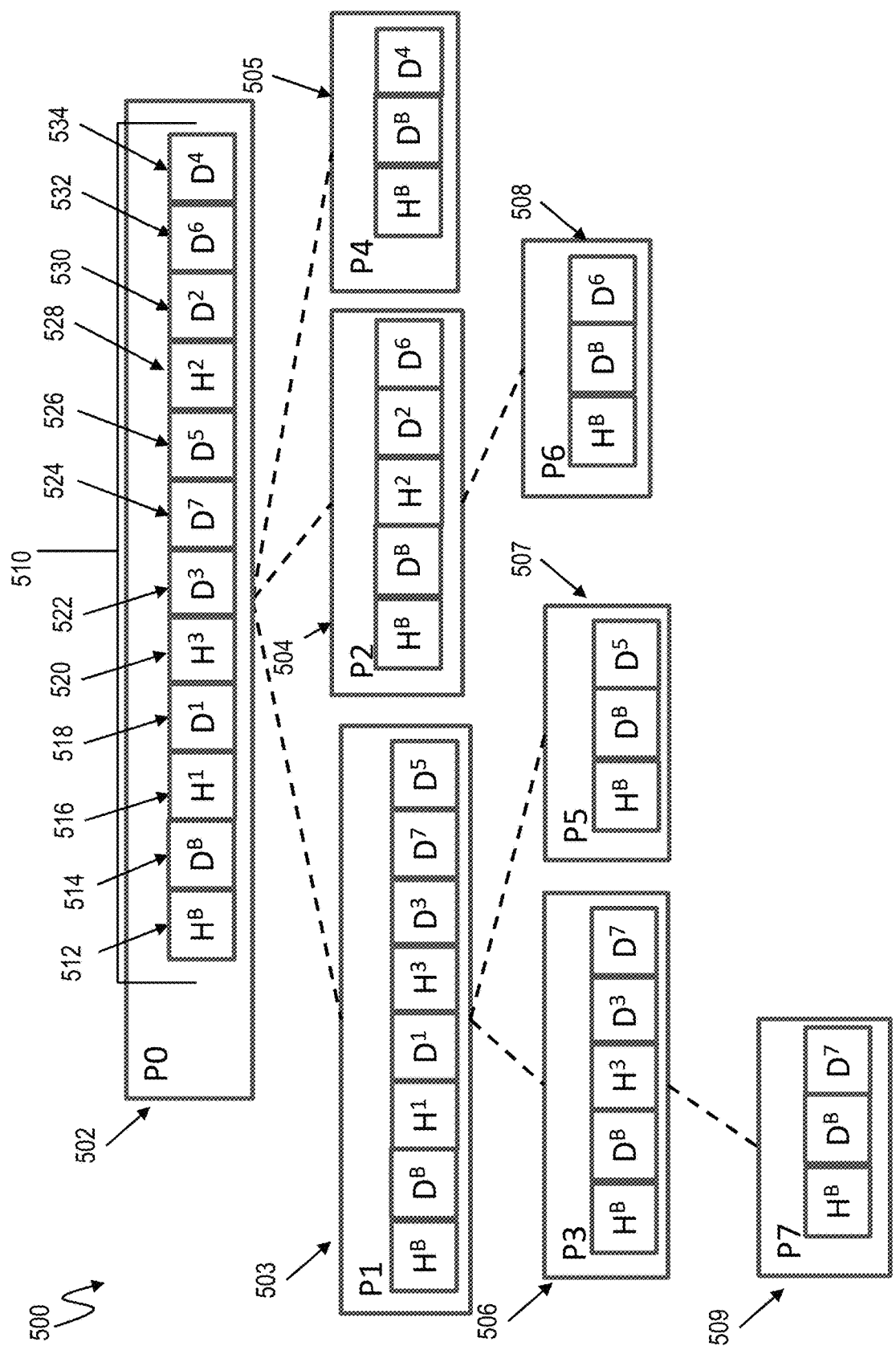
FIG. 5 is a block diagram illustrating a combination of a broadcast operation and a scatter operation in accordance with one or more embodiments of the present invention.

Referring now to FIG. 5, a block diagram illustrating a combination of a broadcast operation and a scatter operation 500 in accordance with one or more embodiments of the present invention is shown. In exemplary embodiments, when the origin participant 502 initiates a combination broadcast scatter operation 500, the origin participant 502 obtains a tree structure to be used for the combination broadcast scatter operation 500. The tree structure includes a plurality of nodes 503, 504, 505, 506, 507, 508 and 509.

After the tree structure is obtained, the origin participant 502 creates a message 510 that includes a broadcast header 512, a broadcast data payload 514, multiple scatter headers 516, 520, 528, and multiple scatter data payloads 518, 522, 524, 526, 530, 532, 534. In exemplary embodiments, the origin participant 502 creates a scatter data payload 518, 522, 524, 526, 530, 532, 534 for each node 503, 504, 505, 506, 507, 508 and 509 in the tree structure. Likewise, the origin participant 502 creates a scatter header 516, 520, 528 for each node 503, 506, 504 of the tree structure that has at least one child node. In exemplary embodiments, the scatter header 516, 520, 528 for each node 503, 506, 504 includes a description of the sub-tree of the tree structure that depends on the node 503, 506, 504. The scatter header 516, 520, 528 may also describes the base address of the scatter data payloads 518, 522, 524, 526, 530, 532, 534, length of scatter data payloads 518, 522, 524, 526, 530, 532, 534.

In exemplary embodiments, the message 510 is created by the origin participant 502 such that the portions of the message 510 that will be transmitted to each child node are contiguous. For example, as illustrated, the headers 516, 520 and data payloads 518, 522, 524, 526 that will be transmitted to child node 503 are contiguous. Likewise, header 528 and data payloads 530, 532 that will be transmitted to child node 504 are contiguous.

Once a child node receives a portion of the message 510, the child node is configured to inspect the header corresponding to the child node to discover the structure of the data payload and the form of the sub-tree below the child node, if any. The child node is further configured to extract a copy of the broadcast payload 514 for its consumption and to remove the scatter payload that corresponds to the child node. For example, child node 503 will inspect the broadcast header 512 and extract a copy of the broadcast payload 514 and inspect the scatter header 516 and extract the scatter payload 518. Based on the information in the broadcast header 512 and the scatter header 516, the child node 503 will create and transmit messages to child nodes 506 and 507.

In exemplary embodiments, the child node only propagates a portion of the message to each child node that depends from it, i.e., the child node only sends the subset of the headers and data payloads destined for a specific subtree to that subtree. For example, child node 503 transmits broadcast header 512, broadcast data payload 514, scatter header 520 and scatter data payloads 522, 524 to child node 506 and broadcast header 512, broadcast data payload 514, and scatter data payload 526 to child node 507.

In exemplary embodiments, each child node may be configured to add additional data to the header and/or data payload that are propagated to its subtree. In addition, each child node may be configured to alter the tree structure for its subtree. For example, a child node may have knowledge that a node in its subtree is offline or having an unexpected performance issue, in this case, the child node may replace that node in its subtree with a different node.

Referring now to FIG. 6, a flowchart of a method 600 for initiating a distributed communication operation in accordance with one or more embodiments of the present invention is shown. In exemplary embodiments, the distributed communication operation is one of a broadcast operation, a scatter operation, or a combination of broadcast and scatter operations. As illustrated, the method 600 includes receiving a request to perform a distributed communication operation, as shown at block 602. Next, as shown at block 604, the method 600 includes obtaining a tree structure for performing the distributed communication operation. In exemplary embodiments, a computing system that is initiating a distributed communication operation is a root node of the tree structure.

As shown at block 606, the method 600 also includes creating a message having header information and a payload for the distributed communication operation. In exemplary embodiments, the message is created by organizing the header information and the payload based on the tree structure. In one embodiment, the header information and the payload are organized such that a portion of the header information and a portion of the payload data to be transmitted to a child node are contiguous. The method 600 further includes transmitting a portion of the message to each child node of the first computing system, wherein the portion transmitted to each child node is unique, as shown at block 608. In exemplary embodiments, the portion of the message transmitted to each child node includes a child header that defines a sub-tree structure of the child node.

In one embodiment, the distributed communication operation is a broadcast operation and the payload of the message transmitted to each child includes a broadcast payload, which is the same for each child node. In another embodiment, the distributed communication operation is a scatter operation and the portion of the message transmitted to each child includes a scatter payload obtained based on the payload. The scatter payload transmitted to each child node is different than the scatter payloads transmitted to the other child nodes.

Referring now to FIG. 7, a flowchart of a method 700 for performing distributed communication operations in accordance with one or more embodiments of the present invention is shown. As shown at block 702, the method 700 begins with a child node receiving a distributed communication operation message from a parent node. In exemplary embodiments, the distributed communication operation is one of a broadcast operation, a scatter operation, or a combination of broadcast and scatter operations. Once the child node receives the distributed communication operation message, it obtains information regarding its subtree from a header of the distributed communication operation message. Next, based on the subtree information, the method 700 determines whether the child node a terminal node, as shown at decision block 704.

Based on a determination that the child node is a terminal node, the method 700 proceeds to block 710 and the child node extracts the data payload needed by the child node. Based on a determination that the child node is not a terminal node, the method 700 proceeds to block 706 and the child node obtains sub-tree data from a header of the message and creates a message for each node that depends from the child node. In exemplary embodiments, the message created for each node only includes header information and payload data that is required for the sub-tree corresponding to the destination child node. The message transmitted to each child node can include one or more of a broadcast header, a scatter header, a broadcast payload and a scatter payload. Next, as shown at block 708, the method 700 includes transmitting messages to each node that depends from the child node depends from the child node. The method 700 further includes transmitting an acknowledgment message to the parent node, as shown at block 712.

Technical advantages and benefits include methods, systems, and computer program products for performing distributed communication operations using execution trees that are configured to dynamically adapt based on network and computing conditions. The method for performing distributed communication operations only requires that the origin participant, or root node, have knowledge of the tree structure that is used to execute the distributed communication operation. As a result, different tree structures can be used to execute different distributed communication operations and the tree structures can be updated without synchronizing the knowledge of the tree structure to each node of the tree.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving a request, by a first computing system, to perform a distributed communication operation;
obtaining, by the first computing system, a tree structure for performing the distributed communication operation, wherein the first computing system is a root node of the tree structure;
creating, by the first computing system, a message having header information and a payload for the distributed communication operation; and
transmitting, by the first computing system, a portion of the message to each child node of the first computing system, wherein the portion transmitted to each child node is unique.

2. The method of claim 1, wherein the portion of the message transmitted to each child node includes a child header which defines a sub-tree structure of the child node.

3. The method of claim 1, wherein the distributed communication operation is a broadcast operation and wherein the payload of the message transmitted to each child includes a broadcast payload.

4. The method of claim 1, wherein the distributed communication operation is a scatter operation and wherein the portion of the message transmitted to each child includes a scatter payload obtained based on the payload.

5. The method of claim 1, wherein the distributed communication operation is a broadcast and scatter operation.

6. The method of claim 1, wherein the message is created by organizing the header information and the payload based on the tree structure.

7. The method of claim 6, wherein the header information and the payload are organized such that a portion of the header information and a portion of the payload data to be transmitted to a child node are contiguous.

8. A system comprising:
a memory having computer readable instructions; and
one or more processors for executing the computer readable instructions, the computer readable instructions controlling the one or more processors to perform operations comprising:
receiving a request, by a first computing system, to perform a distributed communication operation;
obtaining, by the first computing system, a tree structure for performing the distributed communication operation, wherein the first computing system is a root node of the tree structure;
creating, by the first computing system, a message having header information and a payload for the distributed communication operation; and
transmitting, by the first computing system, a portion of the message to each child node of the first computing system, wherein the portion transmitted to each child node is unique.

9. The system of claim 8, wherein the portion of the message transmitted to each child node includes a child header which defines a sub-tree structure of the child node.

10. The system of claim 8, wherein the distributed communication operation is a broadcast operation and wherein the payload of the message transmitted to each child includes a broadcast payload.

11. The system of claim 8, wherein the distributed communication operation is a scatter operation and wherein the portion of the message transmitted to each child includes a scatter payload obtained based on the payload.

12. The system of claim 8, wherein the distributed communication operation is a broadcast and scatter operation.

13. The system of claim 8, wherein the message is created by organizing the header information and the payload based on the tree structure.

14. The system of claim 13, wherein the header information and the payload are organized such that a portion of the header information and a portion of the payload data to be transmitted to a child node are contiguous.

15. A computer program product comprising a computer readable storage medium having program instructions embodied therewith, the program instructions executable by a processor to cause the processor to perform operations comprising:
receiving a request, by a first computing system, to perform a distributed communication operation;
obtaining, by the first computing system, a tree structure for performing the distributed communication operation, wherein the first computing system is a root node of the tree structure;
creating, by the first computing system, a message having header information and a payload for the distributed communication operation; and
transmitting, by the first computing system, a portion of the message to each child node of the first computing system, wherein the portion transmitted to each child node is unique.

16. The computer program product of claim 15, wherein the portion of the message transmitted to each child node includes a child header which defines a sub-tree structure of the child node.

17. The computer program product of claim 15, wherein the distributed communication operation is a broadcast operation and wherein the payload of the message transmitted to each child includes a broadcast payload.

18. The computer program product of claim 15, wherein the distributed communication operation is a scatter operation and wherein the portion of the message transmitted to each child includes a scatter payload obtained based on the payload.

19. The computer program product of claim 15, wherein the distributed communication operation is a broadcast and scatter operation.

20. The computer program product of claim 15, wherein the message is created by organizing the header information and the payload based on the tree structure.

\* \* \* \* \*